United States Patent [19]

Annen et al.

[11] Patent Number: 5,079,108

[45] Date of Patent: Jan. 7, 1992

[54] DRY CELL SEAL CLOSURE

[75] Inventors: James H. Annen; Daniel A. Schneider, both of Dane, Wis.

[73] Assignee: Rayovac Corporation, Madison, Wis.

[21] Appl. No.: 714,355

[22] Filed: Jun. 12, 1991

Related U.S. Application Data

[63] Continuation of Ser. No. 453,571, Dec. 20, 1989, abandoned.

[51] Int. Cl.⁵ .................... H01M 2/02; H01M 2/06; H01M 6/06
[52] U.S. Cl. .................... 429/171; 429/164; 429/166; 429/168; 429/169; 429/170
[58] Field of Search ............... 429/164, 166, 168, 169, 429/170, 171

[56] References Cited

U.S. PATENT DOCUMENTS

| | | | |
|---|---|---|---|
| 2,243,938 | 6/1941 | Anthony | 429/170 |
| 3,506,495 | 4/1970 | Reilly et al. | 429/171 |
| 4,001,044 | 6/1977 | Miyoshi et al. | |
| 4,632,887 | 12/1986 | Jung | 429/171 |

FOREIGN PATENT DOCUMENTS 0037122 3/1986 European Pat. Off. .
0337121 3/1986 European Pat. Off. .

*Primary Examiner*—Brian E. Hearn
*Assistant Examiner*—Maria Nuzzolillo
*Attorney, Agent, or Firm*—Kenyon & Kenyon

[57] ABSTRACT

An improved dry cell seal closure is disclosed which will substantially prevent moisture loss from and/or oxygen ingress into a battery cell while maximizing the volume available within the cell for the cathode mix core. The seal closure comprises a seal member, such as a plastic washer, placed on top of the cell, covering all of the edge of the domed lip; sealing means, such as an adhesive coated plastic tape, adhesive coated shrink film wrap or shrink film tube, positioned to cover all of the edge and at least part of the upper surface of the seal member and to extend over at least a portion of the side of the cell, thus holding the seal member in place; a compression member placed over the seal member to partially cover the sealing means, further securing the seal member and creating a seal between the seal member and the domed lip of the cell and between the seal member and the metal terminal member of the battery an insulator tube placed around the cell and extending over at least a portion of the top of the metal terminal member; and an outer jacket covering the insulator tube and dry cell which extends radially inwardly over a portion of the top of the metal terminal member so as to exert and maintain adequate sealing pressure on said metal terminal member, said compression member, said sealing means, and said seal member.

26 Claims, 1 Drawing Sheet

DRY CELL SEAL CLOSURE

This is a continuation of copending application Ser. No. 07/453,571 filed on Dec. 20, 1989, now abandoned.

FIELD OF THE INVENTION

The invention relates to seal closures for galvanic dry cells designed to maximize internal volume available for reactive material component and to prolong shelf life by preventing moisture loss and oxygen ingress.

BACKGROUND OF THE INVENTION

Many common dry cells are generally constructed by filling a zinc alloy canister or "zinc can", which acts as the cell anode, with a depolarizer mix core. A carbon rod or other current collector is then inserted into the can such that it is surrounded by the depolarizer mix. The cells are generally sealed by inserting a support washer over the cathode depolarizer mix and then pouring asphalt onto the washer to provide an asphalt seal and an airspace above the mix below the seal to collect the discharged gases and cell exudate. Conducting plates are then contacted with the carbon rod and bottom of the zinc can to produce the positive and negative terminals of the battery. Finally, the entire assembly is encased by an insulating sleeve, that covers the sides of the can, and/or a metal or polymer coated paper jacket that surrounds the cell, with only the positive and negative terminals exposed.

Asphalt seals are, however, disadvantageous for several reasons. Firstly, asphalt seals occupy a relatively large amount of space, thereby diminishing the volume available for the mix core and collection of gaseous discharge. As a result, the useful life of the cell is also diminished. Secondly, assembly of cells with asphalt seals is dirty and in some cases hazardous. Thirdly, conventional asphalt seals are susceptible to failure in a variety of ways. At low temperatures, asphalt sealant can contract, become brittle and split open. At high temperatures, asphalt seals may fail due to softening of the asphalt, resulting in flow of the asphalt away from sealed surfaces. During heating of the asphalt to cause a meniscus to form at the can-asphalt interface, pin holes or gas bubbles may also form in the pitch as a result of expansion of the air in the void volume within the cell thereby weakening the seal. Finally, the inside of the can and/or the can lip could become dirty due to electolyte and/or mercury contamination prior to dispensing the asphalt resulting in an incomplete seal which could fail because of insufficient adhesion of the asphalt to the can. Each of these types of failure results in moisture loss and/or oxygen ingress to the cell which can adversely affect cell performance.

Two approaches to eliminating asphalt seals are disclosed in U.S. Pat. Nos. 4,469,764 and 4,684,589. In U.S. Pat. No. 4,469,764, the carbon pencil is placed through a hole in the closure. The upper rim of the can is then embedded in a sealant on the underside of the molded closure. In U.S. Pat. No. 4,684,589, an airtight, non-conductive plug is placed onto the top of the dry cell can and is held in place by crimping the top portion of the battery jacket over the edges of the plug. However, these constructions often require special preformed plastic parts and/or the precise metering of sealant material during manufacturing, both of which make manufacturing cells incorporating such constructions more difficult and less economical.

It is an object of the present invention to provide a sufficiently air-tight battery seal which prolongs battery shelf life by effectively preventing moisture loss from, or oxygen ingress into, the battery.

It is also an object of the present invention to provide a reliable battery seal which is more economical to manufacture than molded grommet type seals and takes up less space than conventional asphalt overpour seals.

SUMMARY OF THE INVENTION

In accordance with the present invention, an improved dry cell seal closure is disclosed which deters loss of moisture and oxygen ingress while substantially increasing the volume available within the cell for the mix core. The seal closure comprises a seal member, such as a washer, placed on top of the dry cell and covering all of the edge of the domed lip; a sealing means, such as an adhesive coated tape, adhesive coated shrink film wrap or shrink film tube, positioned to cover all of the outer edge and at least part of the upper surface of the seal member and to extend over at least, but not limited to, a portion of the side of the cell, thus holding the seal member in place; a compression member placed over the seal member to partially cover the sealing means, further securing the seal member and creating a seal between the seal member, sealing means, and top metal terminal of the battery; a metal terminal member placed over the compression member and covering the top of the carbon electrode; an insulator tube placed around the cell and extending over at least a portion of the top of the metal terminal member; and an outer jacket covering the insulator tube and extending radially inwardly over a portion of the top of the metal terminal member so as to exert and maintain adequate sealing pressure on the metal terminal member, the compression member, the sealing means, and the seal member.

Batteries incorporating the seal closure are also disclosed.

DETAILED DESCRIPTION OF THE INVENTION

Figure 1:
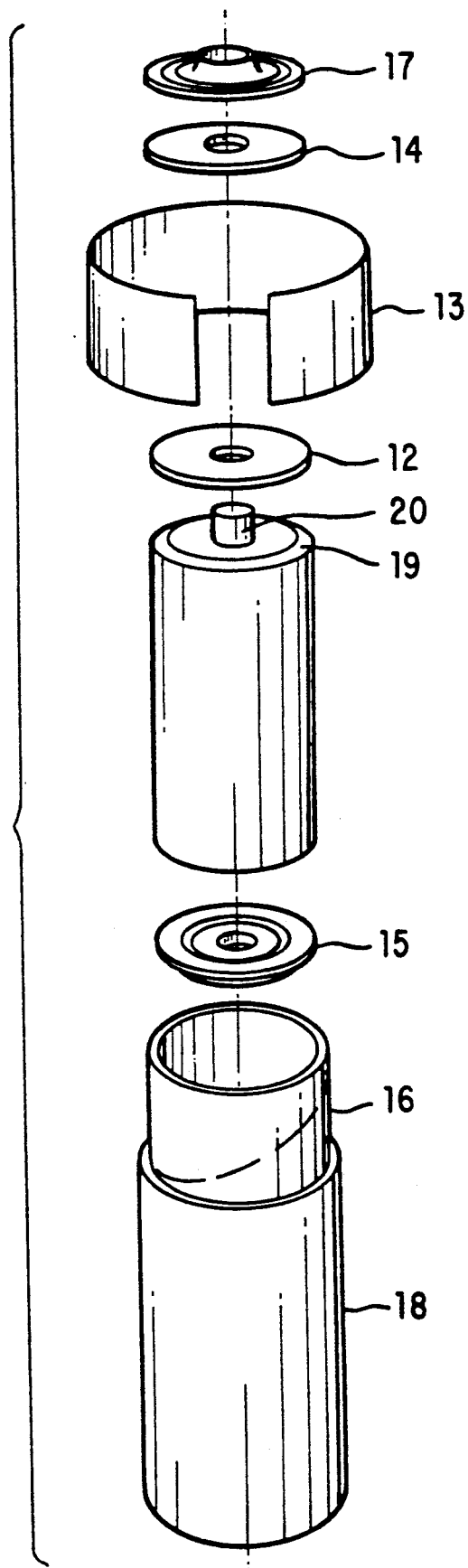
FIG. 1 is an exploded view of a battery incorporating the seal closure construction of the present invention.
Figure 2:
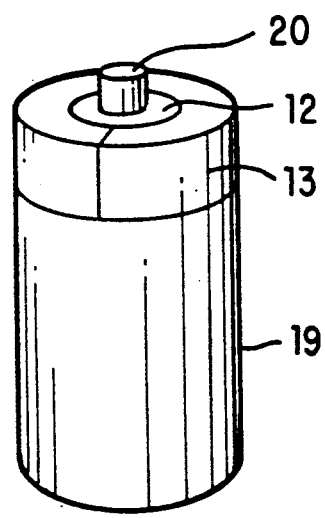
FIG. 2 is a side elevation of one embodiment of a dry cell, seal member and sealing means assembly in accordance with the present invention.

The present invention can be understood by reference to FIGS. 1 and 2. Dry cell 11 is a conventional zinc can dry cell with a carbon pencil electrode 20 protruding from the tope of the can. A seal member 12 is placed directly on the domed lip 19 of cell 11. Seal member 12 is adapted for making sealing contact along its lower surface with the domed lip 19 of cell 11. Seal member 12 also has a hole through which carbon pencil 20 extends when seal member is in place, such that seal washer 12 provides an interference fit with the carbon pencil 20. Seal member 12 is preferably a washer made of a compressible plastic material having low moisture permeability.

Sealing means 13 holds seal member 12 in place. Sealing means 13 extends over the outer edge and over most of the upper surface of seal washer 12. Sealing means 13 also extends over a portion of the side of cell 11, thus retaining seal member 12 in place, as shown in FIG. 2. The sealing means 13 should preferably fit snugly around seal member 12 and cell 11 to prevent oxygen ingress and/or loss of cell moisture around the domed lip of 19. Sealing means 13 can be an adhesive coated plastic tape wrap. In fact, seal closures made with an adhesive coated vinyl tape wrap showed the highest percentage retention of battery life during experimental testing. Adhesive tapes useful for practicing the present invention include without limitation those of vinyl, mylar, saran, polyethylene, polypropylene and polyvinylalcohol. Sealing means 13 can be an adhesive coated shrink film wrap. Shrink film wraps useful for practicing the present invention include without limitation those of polyvinyl chloride and other commercially available shrink film materials.

In another embodiment, sealing means 13 extends down the entire side of cell 11 and over a portion of the bottom of cell 11 leaving a sufficient portion of the bottom of cell 11 exposed to provide adequate electrical contact. Thus, sealing means 13 not only serves to retain seal member 12 in place, but also serves to seal the side of cell 11. In this embodiment, sealing means 13 may also be a shrink film tube which is made to fit snugly around (a) the edge and some of the upper surface of seal member 12 and (b) all of the sides of cell 11 and over a portion of the bottom of cell 11. Suitable shrink film tube materials include without limitation those supplied by Templock Corporation and other vendors of heat shrinkable tube materials. However, an adhesive coating is preferred on sealing member 13 since it provides the tightest fit between seal member 12 and cell 11 and increases the inhibition of moisture along the outer surface of the can.

Compression member 14 is placed over seal member 12 covering the upper edge of sealing means 13. In the embodiment shown in FIG. 1, the compression member 14 is a washer made of a compressible nonporous plastic. Compression member 14 provides additional pressure on seal washer 12, increasing its ability to prevent moisture loss and/or oxygen ingress around the domed lip 19 of the cell and from the outer edge of sealing means 13 on the upper surface of seal washer 12.

Finally, metal terminal member 17 is placed over a compression member 14, providing a top battery terminal. The compression member 14 functions as a gasket to prevent loss of moisture vapors escaping through the carbon pencil 20 and also prevents the sealing means 13 from being cut or pinched by the metal terminal member 17 during later crimping operations. Bottom member 15 is placed on the bottom of the cell. Bottom member 15 is adapted to make electrical contact with the zinc surface of dry cell 11 and serves as a battery terminal. In some embodiments where sealing means 13 extends around a portion of the cell bottom, bottom member 15 must be adapted to contact the zinc can without interference from the sealing means.

This entire assembly is then placed inside insulator tube 16 and metal or polymer coated paper jacket 18. A metal jacket is preferred so as to exert and to maintain adequate sealing pressure. The jacket is joined, to other cell components in accordance with standard practices in the art including without limitation crimping a metal jacket to exert inward pressure through the insulator tube 16 and metal terminal member 17 into compression member 14.

EXAMPLES

Six battery designs were constructed and compared for performance. The designs differed in seal construction, the size of the zinc can and battery overwrap components consisting of the bottom terminal member 15, the insulator tube 16, the metal terminal member 17 and the metal jacket 18. Each cell used a mix core containing 48-52% (by weight) $MnO_2$, 7-9% carbon black and an aqueous electrolyte consisting of 24-27% $ZnCl_2$ and 0-6% $NH_4Cl$. The differing features of each design are summarized below in Table 1. Test results for each design and for preferred embodiments in seal construction are listed in Table 2.

TABLE 1

| Design | Seal | Zinc Can Height | Zinc Can Diameter | Overwrap Components | Mix Core Weight |
|---|---|---|---|---|---|
| 1 | asphalt | 2 1/16" | 1.183" | 6D | 54 grams |
| 2 | present invention | 2 5/32" | 1.183" | 6D | 57 grams |
| 3 | asphalt | 2¼" | 1.245" | 3D | 62 grams |
| 4 | present invention | 2 5/32" | 1.245" | 3D | 64 grams |
| 5 | asphalt | 2 1/16" | 1.245" | 813 | 60 grams |
| 6 | present invention | 2 5/32" | 1.245" | 813 | 64 grams |

TABLE 2

| Design | Lot | Initial Service from HIFT Discharge | % service life retention after shelf storage | | | |
|---|---|---|---|---|---|---|
| | | | 2 wk. 160° F. | 4 wk. 130° F. | 4 wk. 113° F. | 12 wk. 113° F. |
| 1 | A | 683 min. | 55.3% | 88.9% | 92.3% | 88.0% |
| 2 | A | 769 min. | 92.4% | 92.9% | 95.6% | 92.6% |
| | B | 772 min. | 95.3% | 95.8% | 94.7% | 93.4% |
| 3 | A | 900 min. | — | — | — | 93.8% |
| 4 | A | 934 min. | 78.8% | 89.9% | — | 90.3% |
| 5 | A | 840 min. | — | — | — | 97.7% |
| 6 | A | 938 min. | 79.7% | 89.3% | — | 90.2% |
| | B | 943 min. | 85.8% | 91.7% | — | 89.0% |
| | C | 937 min. | 90.5% | 91.8% | — | 89.2% |

The "6D" overwrap components used in Designs 1 and 2 are employed to control leakage in conventional zinc-carbon batteries. Use of a thick absorbant paper tube and double locked seam outer metal jacket restricts the zinc can to a 1.183" outer diameter. Design 1 represents a control construction and contains a conventional overpoured asphalt seal. Design 2 contains a seal of this invention and employs a plastic polystyrene seal washer, a sealing means of adhesive coated vinyl tape and a plastic polystyrene compression washer. Embodiment 2A uses a 1 inch wide strip of adhesive coated vinyl tape which extends 0.5-0.75 inches down the side of the zinc can. Embodiment 2B uses a 2⅜ inch wide strip of adhesive coated vinyl tape which extends to the bottom of the zinc can.

The "3D" overwrap components used in Designs 3 and 4 have been employed in industrial type zinc-carbon batteries. A larger diameter "D" size double locked seam metal outer jacket and a thin poly kraft laminated insulator tube allows the use of a larger (1.245" outer dia.) zinc can. Design 3 represents a control construction and contains a conventional overpoured asphalt seal. Design 4 contains a seal of this invention and employs a polystyrene seal washer and a polyethylene compression washer. In embodiment 4A, a shrink film tube covering the sides and a portion of the bottom of the zinc can is used as the sealing means. This is a preferred embodiment for this overwrap construction since it provides the battery with additional leakage protection.

The "813" overwrap components used in Designs 5 and 6 are employed in Alkaline "D" size batteries. This overwrap construction utilizes a thin kraft paper insulator tube and a butt seam metal outer jacket to allow the use of a taller and larger (1.245" outer diameter) zinc can. Design 5 represents a control construction and contains a conventional internal poured asphalt seal. Design 6 contains a seal of this invention and employs a polystyrene plastic seal washer and a polyethylene compression washer. Embodiment 6A contains a shrink film tube as the sealing means. Embodiment 6B contains an adhesive coated shrink film wrap which extends down the entire side of the zinc can. Embodiment 6C contains a 2⅜" wide strip of adhesive coated vinyl tape which extends to the bottom of the zinc can. Embodiments 6B and 6C are preferred for this overwrap construction since they provide additional battery protection against expansion and leakage during and after cell discharge.

Use of the seal closure of the present invention as shown by designs 2, 4 and 6, decreased the space occupied by the conventional asphalt seal construction. This allowed use of a taller zinc can, thus providing more internal cell volume for the depolarizer mix.

Batteries constructed with the various designs were tested initially and after periods of elevated temperature storage on the 2.2 ohm (HIFT) Heavy Industrial Flashlight Test (4 minute discharge every 15 minutes over an eight hour period, repeated daily) until the 0.65 CCV endpoint was reached. The results of these tests are summarized on Table 2. In each instance, designs employing the seal closure of the present invention (designs 2, 4 and 6) provided greater initial HIFT performance as compared to similarly constructed cells having asphalt seals (designs 1, 3 and 5). Design 2 showed an average increase of 12.8% over Design 1. Design 4 showed an average increase of 3.8% over Design 3. Design 6 showed an average 11.8% increase over Design 5. These increases in initial HIFT performance are the result of the increased mix core weight obtainable through use of the seal closure of the present invention. At 113° F. and 130° F. storage, percent retention of initial HIFT service life was comparable for all designs. However, at 160° F. storage, Designs 2, 4 and 6 employing the seal closure of the present invention retained a much larger percentage of initial HIFT service as compared to design 1 employing an asphalt seal. This improvement is due to the greater resistance to failure at elevated temperature of the seal closure of the present invention, thereby reducing moisture loss from and/or oxygen ingress into the cell.

From the foregoing it will be apparent to those skilled in the art that various modifications in the above-described devices can be made without departing from the scope and spirit of the invention. Accordingly, the invention may be embodied in other specific forms without departing from the spirit or essential characteristics thereof. Present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A seal closure comprising:
   (a) a seal member consisting of a washer placed on top of a dry cell and covering the domed lip of said dry cell;
   (b) sealing means covering all of the edge and at least part of the upper surface of said seal member and extending over at least a portion of the side of said dry cell;
   (c) a compression member placed over said seal member partially covering said sealing means and creating a seal between said seal member and the top terminal of said dry cell;
   (d) a metal terminal member placed over said compression member;
   (e) an insulator tube surrounding said dry cell and extending radially inwardly over a portion of the top of said metal terminal member; and
   (f) an outer jacket covering said insulator tube and said dry cell and extending radially inwardly over a portion of the top of said metal terminal member so as to exert and maintain adequate sealing pressure on said metal terminal member, said compression member, said sealing means, and said seal member.

2. The seal closure of claim 1, wherein said compression member is placed over said seal member and said sealing means to also create a seal between said sealing means, said seal member, and said metal terminal member of said dry cell.

3. The seal closure of claim 1 wherein said seal member comprises a flat plastic washer placed on the outer edge of the domed lip of said dry cell, but does not extend into the cell cavity.

4. The seal closure of claim 1, wherein said sealing means comprises an adhesive-coated tape.

5. The seal closure of claim 1, wherein said sealing means comprises an adhesive-coated shrink film.

6. The seal closure of claim 1, wherein said sealing means comprises a shrink film tube.

7. The seal closure of claim 1, wherein said sealing means extends tightly over the entire side of said cell and partially covers the bottom of said cell.

8. The seal closure of claim 1, wherein said compression member comprises a plastic washer.

9. A battery comprising a seal closure, said seal closure comprising:
   (a) a seal member consisting of a washer placed on top of a dry cell and covering the domed lip of said dry cell;
   (b) sealing means covering all of the edges and at least part of the upper surface of said seal member and extending over at least a portion of the side of said dry cell;
   (c) a compression member placed over said seal member, partially covering said sealing means;
   (d) a metal terminal member placed over said compression member;
   (e) an insulator tube surrounding said dry cell and extending radially inwardly over a portion of the top of the said metal terminal member; and
   (f) an outer jacket covering said insulator tube and said dry cell and extending radially inwardly over a portion of the top of said metal terminal member so as to exert and maintain adequate sealing pressure on said metal terminal member, said compression member, said sealing means, and said seal member.

10. The battery of claim 9 wherein said compression member is placed over said seal member and said sealing means to also create a seal between said seal member, said sealing means, and said metal terminal member of said dry cell.

11. The battery of claim 9 wherein said seal member comprises a flat plastic washer placed on the outer edge of the domed lip of said dry cell, but does not extend into the cell cavity.

12. The battery of claim 9, wherein said sealing means comprises an adhesive-coated tape.

13. The battery of claim 9, wherein said sealing means comprises an adhesive-coated shrink film.

14. The battery of claim 9, wherein said sealing means comprises a shrink film tube.

15. The battery of claim 9, wherein said sealing means extends tightly over the entire side of said cell and partially covers the bottom of said cell.

16. The battery of claim 9, wherein said compression member comprises a plastic washer.

17. The seal closure of claim 1 wherein said sealing means comprises an adhesive-coated vinyl tape.

18. The battery of claim 9 wherein said sealing means comprises an adhesive-coated vinyl tape.

19. A seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises an adhesive-coated tape.

20. A seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises an adhesive-coated shrink film.

21. A seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises a shrink film tube.

22. A seal closure comprising:
  (a) a seal member place don top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said compression member comprises a plastic washer.

23. A battery comprising a seal closure, said seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises an adhesive-coated tape.

24. A battery comprising a seal closure, said seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises an adhesive-coated shrink film.

25. A battery comprising a seal closure, said seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said sealing means comprises a shrink film tube.

26. A battery comprising a seal closure, said seal closure comprising:
  (a) a seal member placed on top of a dry cell and covering the domed lip of said dry cell;
  (b) sealing means covering all of the edge and at least a part of the upper surface of said seal member and extending over at least a portion of the side of said dry cell; and
  (c) a compression member placed over said seal member partially covering said sealing means and creating a seal between said seal member and said domed lip of said dry cell;
  wherein said compression member comprises a plastic washer.

* * * * *

UNITED STATES PATENT AND TRADEMARK OFFICE
CERTIFICATE OF CORRECTION

PATENT NO. : 5,079,108
DATED : January 7, 1992
INVENTOR(S) : James H. Annen et al It is certified that error appears in the above-indentified patent and that said Letters Patent is hereby corrected as shown below:

| Column | Line | |
|--------|------|---|
| ABS. | 17 | After "battery" insert --of,--. |
| 2 | 53 | Change "tope" to --top--. |
| 2 | 58 | After "member" insert --12--. |
| 3 | 3 | Change "lip of 19" to --lip 19 of cell 11--. |
| 3 | 59 | Change "joined, to" to --joined to--. |
| 3 | 61 | Change "including without limitation" to --including, without limitation,--. |
| 7 | 62 | Change "place don" to --placed on--. |

Signed and Sealed this

Twelfth Day of October, 1993

Attest:

BRUCE LEHMAN

*Attesting Officer*     *Commissioner of Patents and Trademarks*